United States Patent [19]
Chiu et al.

[11] Patent Number: 5,289,333
[45] Date of Patent: Feb. 22, 1994

[54] CASSETTE LOADING APPARATUS FOR LOADING A MAGNETIC RECORDING CASSETTE INTO A ROTARY DRUM DECK OF A CASSETTE PLAYING OR RECORDING APPARATUS

[75] Inventors: Ming-Che Chiu; Chyi-Fwu Chiou, both of Hsinchu, Taiwan

[73] Assignee: Industrial Technology Research Institute, Chutung, Taiwan

[21] Appl. No.: 986,125

[22] Filed: Dec. 4, 1992

[51] Int. Cl.⁵ .......................................... G11B 15/675
[52] U.S. Cl. ................................. 380/96.5; 360/96.6
[58] Field of Search ................. 360/96.5, 96.6, 99.02, 360/99.06; 369/77.1, 77.2

[56] References Cited
U.S. PATENT DOCUMENTS 4,734,800 3/1988 Suzuki .............................. 360/96.5
4,752,844 6/1988 Suzuki .............................. 360/96.5

*Primary Examiner*—John H. Wolff
*Assistant Examiner*—Craig A. Renner
*Attorney, Agent, or Firm*—W. Wayne Liauh

[57] ABSTRACT

A cassette loading apparatus for a rotary drum deck comprises a movable plate-like member which is slidable relative to a stationary member. The two members are disposed on the drum deck with a top member of the drum deck therebetween. A symmetrical four bar linkage is connected between the movable member and the top member of the drum deck. The movable member is moved, under the guidance of fixed shaped slots formed on the side plates of the drum deck, along with a cassette holder into which a cassette is inserted, between an unloading position and a loading position by an actuation drive acting at one side of the cassette holder. The four bar linkage transmits the actuation to the other side of the cassette holder in a substantially synchronous way to make both sides of the cassette holder move symmetrically and synchronously and thus reducing the risk of jamming.

4 Claims, 16 Drawing Sheets

1

CASSETTE LOADING APPARATUS FOR LOADING A MAGNETIC RECORDING CASSETTE INTO A ROTARY DRUM DECK OF A CASSETTE PLAYING OR RECORDING APPARATUS

FIELD OF THE INVENTION

The present invention relates generally to a cassette loading apparatus for a rotary drum deck magnetic recording device wherein a cassette having a magnetic recording media, such as a magnetic tape, wound on the reels thereof is loaded into the rotary drum deck to have the reel hubs engaged and driven by driving axles thereof.

BACKGROUND OF THE INVENTION

Some of the currently available magnetic recording devices comprise a cassette loading apparatus which is driven only at a single side thereof due to the limitation in space arrangement, which cassette loading apparatus provides a loading kinematic action to only one side of the cassette to be loaded. This may induce an instable loading operation if the other side of the cassette is subjected to friction or other resistance in moving in the loading route.

To address the instability problem, another type of prior art cassette loading apparatus adopts gear trains arranged substantially symmetrical about the drum deck to provide a symmetrical loading movement at both sides of the cassette. The principal disadvantage of this type prior art arrangement is that in order to avoid interference with the operation of recording or re-playing operation of the apparatus, the gear trains and the related mechanism have to be disposed close to the top side or bottom side of the recording device housing. This inevitably expands the size or volume of the recording device, and is also in conflict with the world trend of miniaturization for home appliances.

It is therefore desirable to provide a cassette loading apparatus which comprises a single side driven mechanism but adopting a symmetrical linkage to act upon the opposite sides simultaneously so as to overcome the problem of instability while not substantially increasing the overall size thereof.

OBJECTS OF THE INVENTION

It is the principle object of the present invention to provide a cassette loading apparatus suitable for using in a rotary drum deck magnetic recording device comprising basically thin flat members closely disposed around the drum deck which defines a space to receive therein the cassette so as to reduce the space occupied by the cassette loading apparatus.

It is another object of the present invention to provide a cassette loading apparatus suitable for using in a rotary drum deck magnetic recording device comprising a symmetrical four bar linkage which transmits motions occurring at one side of the cassette loading apparatus to the other side thereof in a substantially synchronous way so as to move the cassette in a substantially symmetrical way during loading or unloading operations.

To achieve the above-mentioned object, there is provided a cassette loading apparatus for rotary drum deck comprises a movable plate-like member which is slidable relative to a stationary member. The two members are disposed on the drum deck with a top member of the drum deck therebetween. A symmetrical four bar linkage is connected between the movable member and the top member of the drum deck. The movable member is moved, under the guidance of shaped slots formed on the side plates of the drum deck, along with a cassette holder into which a cassette is inserted, between an unloading position and a loading position by an actuation drive acting at one side of the cassette holder. The four bar linkage transmits the actuation to the other side of the cassette holder in a substantially synchronous way to make both sides of the cassette holder move symmetrically and synchronously and thus reducing the risk of jamming.

Other objects and advantages of the invention will be apparent from the following description of a preferred embodiment taken in connection with the attached drawings, in which:

DETAILED DESCRIPTION OF THE PREFERRED EMBODIMENT

Figure 1:
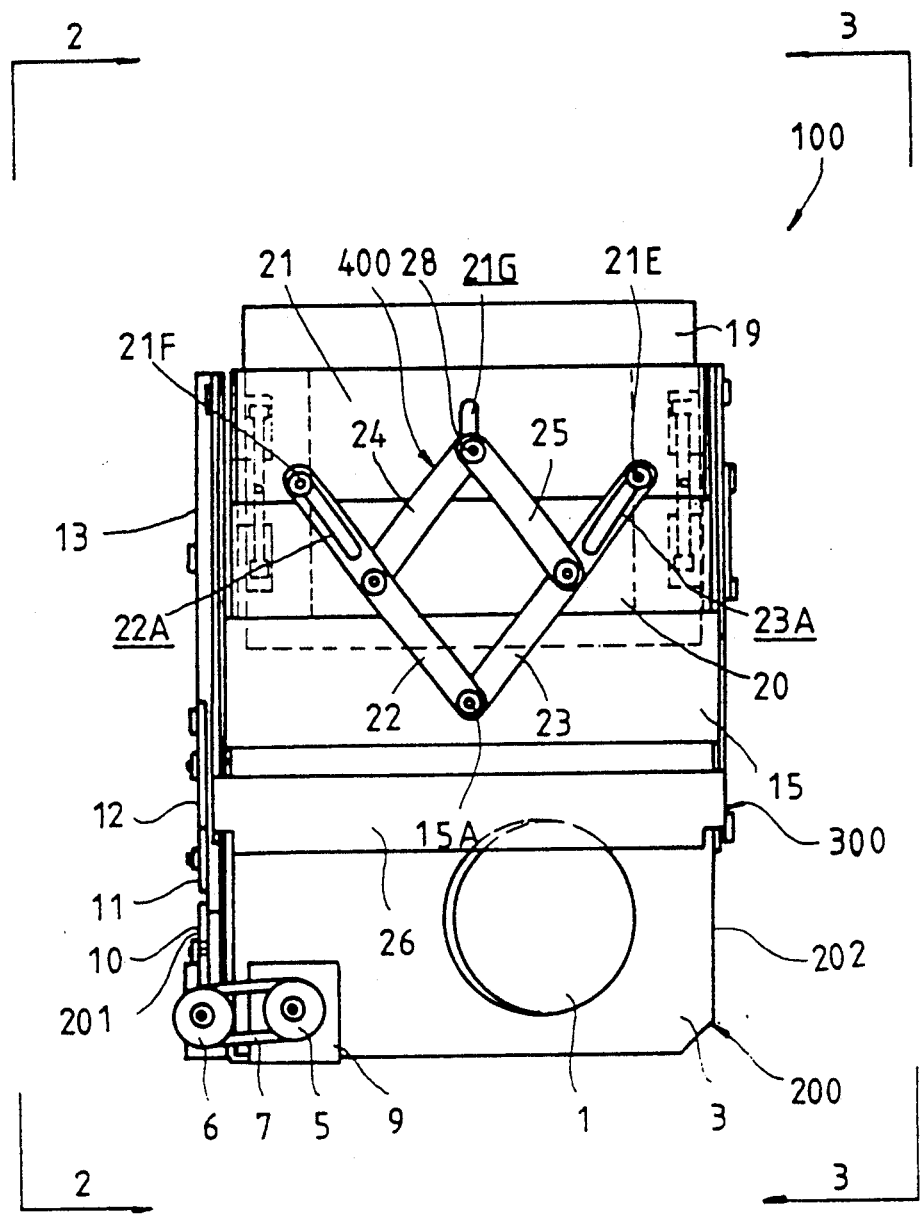
FIG. 1 is a top plan view of a rotary drum deck magnetic recording device with a cassette loading apparatus in accordance with the present invention mounted therein.
Figure 2:
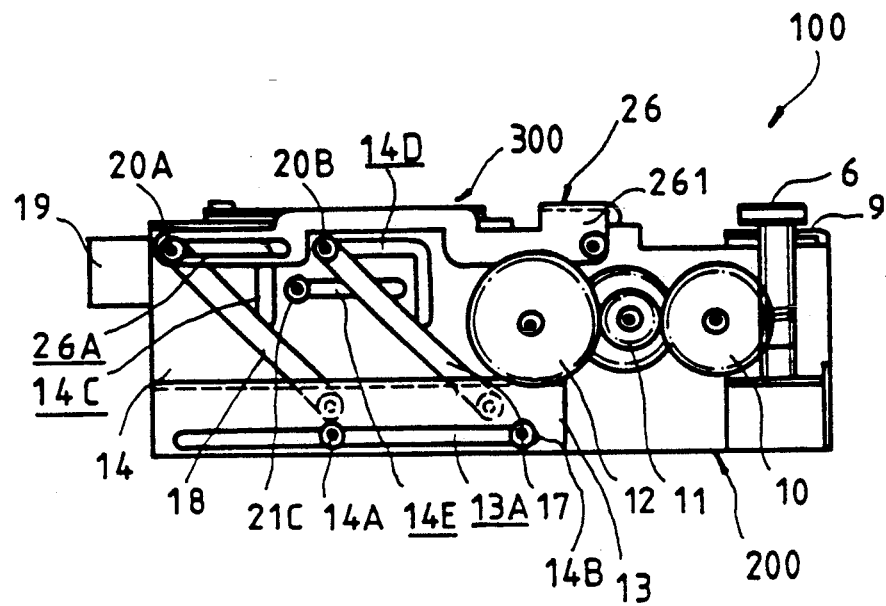
FIG. 2 is a side elevational view taken along the line 2—2 of FIG. 1.
Figure 3:
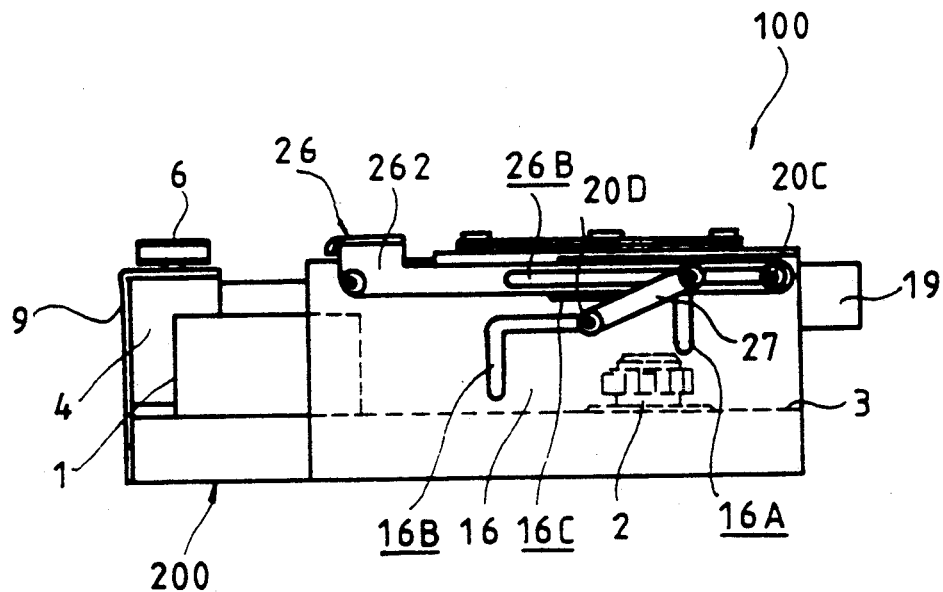
FIG. 3 is a side elevational view taken along the line 3—3 of FIG. 1.
Figure 4:
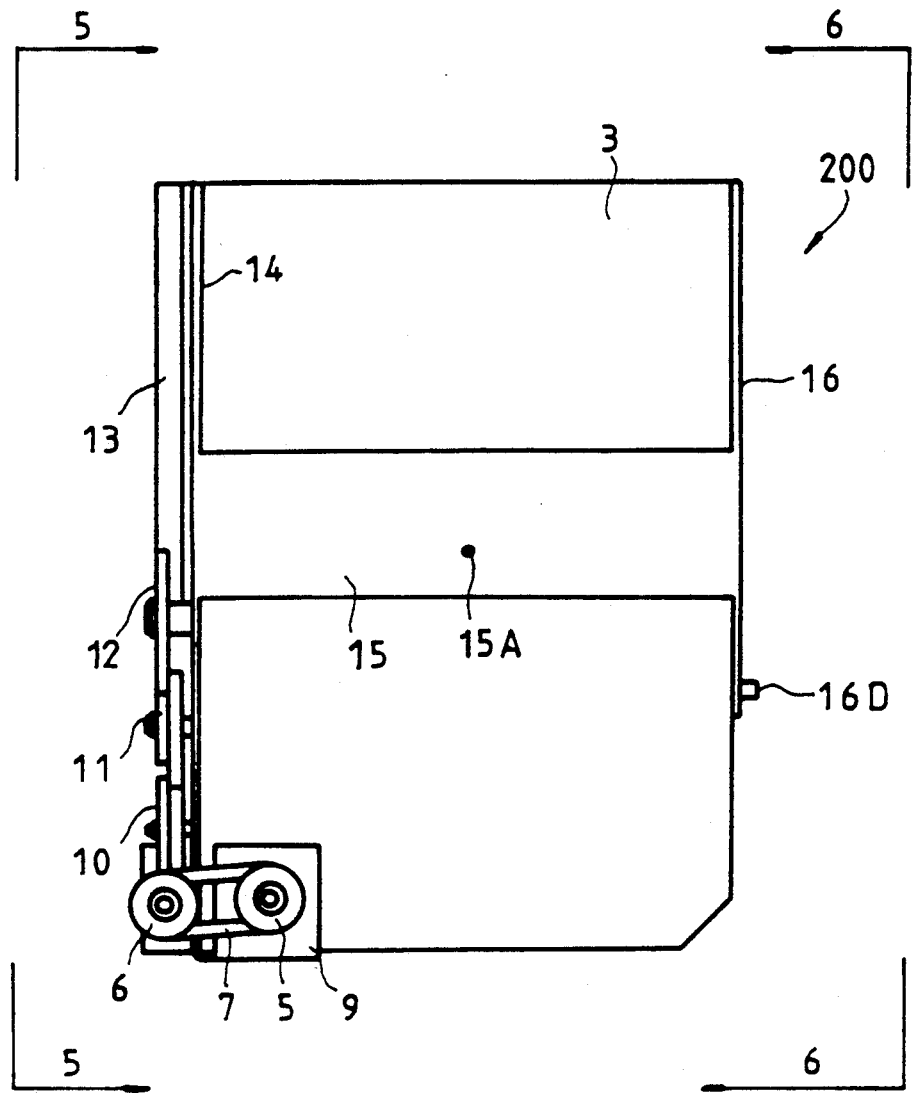
FIG. 4 is a top plan view of the rotary drum deck.
Figure 5:
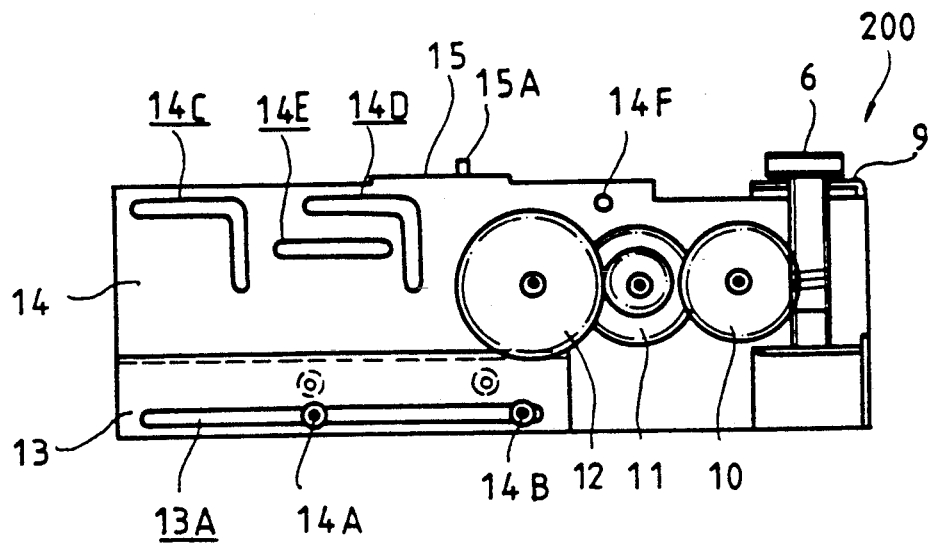
FIG. 5 is a side elevational view taken along the line 5—5 of FIG. 4.
Figure 6:
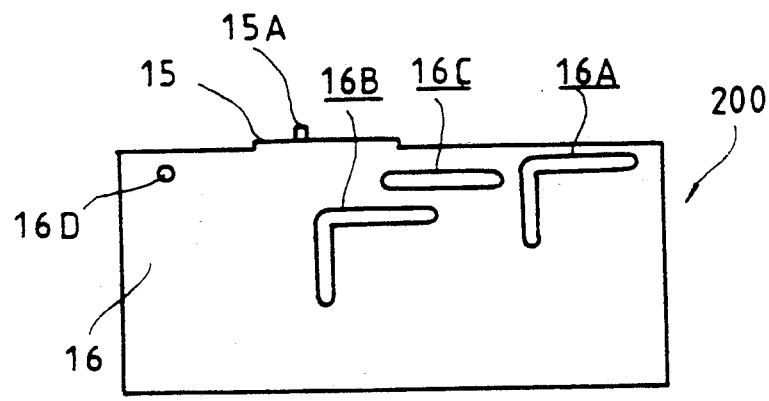
FIG. 6 is a side elevational view taken along the line 6—6 of FIG. 4.

With reference to the drawings and in particular to FIGS. 1-6, wherein a magnetic recording cassette playing apparatus broadly illustrated at 100 is shown, the magnetic recording cassette playing apparatus 100 comprises a deck means 200 (FIGS. 4-6) which is a rotary drum deck having a bottom member 3 with a first side plate 14 and a second side plate 16 perpendicularly mounted thereon on opposite side edges of the bottom member 3 and a top member 15 connecting between the two side plates 14 and 16. The top member 15 comprises a pivot pin 15A formed thereon substantially midway between the side plates 14, 16.

As is usually known, magnetic recording media driving axles 2 and magnetic drum means 1 are provided on the bottom member 3 (see FIG. 3 and FIG. 1) to drive the magnetic recording media contained in a cassette 19 and to receive magnetic signals from the recording media. This construction is well known to those skilled in the art and not a subject of the present invention so that no further detail will be given herein.

A cassette holder 20 which receives the cassette 19 therein is movably disposed within the deck means 200 to move the cassette 19 from an unloading position where the cassette holder 20 is ready for receiving the cassette 19 to a loading position where the cassette holder 20 is substantially located on the bottom member 3 and thus the reel hubs (not shown) of the recording medium fit over the axles 2 to be driven thereby.

The cassette holder 20 is mechanically connected to a torque source, preferably a motor 4 (see FIG. 3) secured on a motor support 9 which is in turn mounted on the deck means 200, via a cassette loading apparatus of the present invention, broadly illustrated at 300, and a reduction gear train, including a plurality of gears 10, 11, 12 and a rack 13 mating the gear 12. Other mechanical elements, such as pulleys 5, 6 and a belt 7 connected therebetween, can also be included. This is not a subject of the present invention and thus will not be further discussed.

All members of the gear train are rotatably mounted on the first side plate 14 of the deck means 200. The rack 13 has an elongated slot 13A to receive therein a pair of guide posts 14A, 14B mounted on the first side plate 14 of the deck means 200 so that the rack 13 is slidable along the first side plate 14 of the deck means 200.

On the first side plate 14 of the deck means 200, a first L-shaped slot 14C, a second L-shaped slot 14D and an elongated slot 14E are formed. Similarly, a first L-shaped slot 16A, a second L-shaped slot 16B and an elongated slot 16C are formed on the second side plates 16 of the deck means 200. Each of these L-shaped slots 14C, 14D, 16A, 16B comprises a horizontal section and a vertical section connected by a connection corner.

The cassette holder 20 has two opposite lateral sides (also referred to as first lateral side and second lateral side) 201, 202 on which a first pair of side rods 20A, 20C are respectively formed and extend into the first L-shaped slot 14C of the first side plate 14 and the first L-shaped slot 16A of the second side plate 16 to be slidably movable therein.

The cassette holder 20 also has a second pair of side rods 20B, 20D respectively formed on the two opposite lateral sides 201, 202 thereof and extending into the second L-shaped slot 14D of the first side plate 14 and the second L-shaped slot 16B of the second side plate 16.

Figure 7:
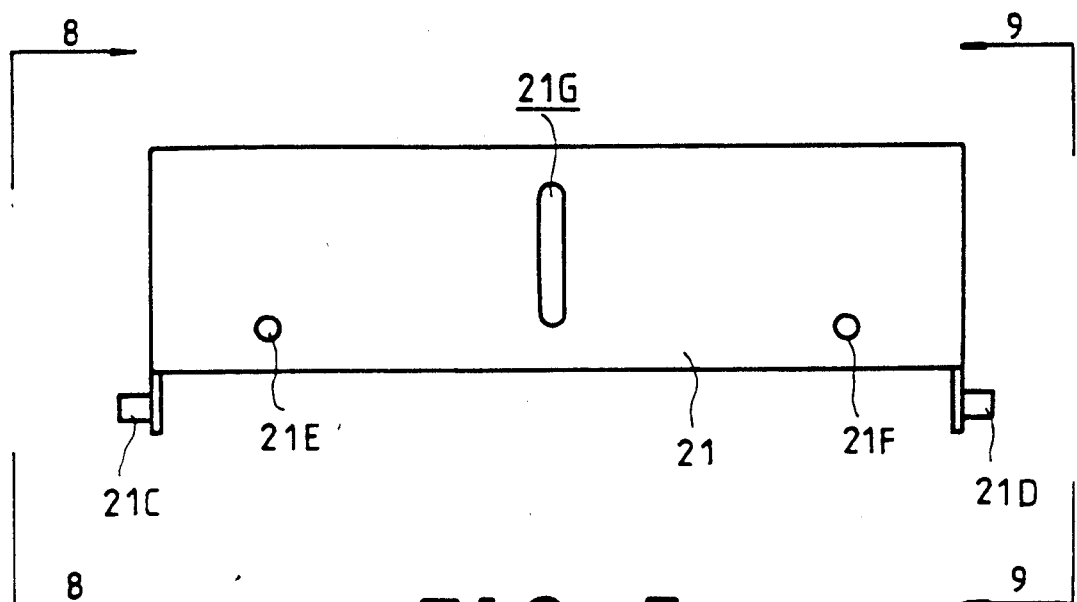
FIG. 7 is a top plan view of the movable member of the cassette loading apparatus in accordance with the present invention.
Figure 8:
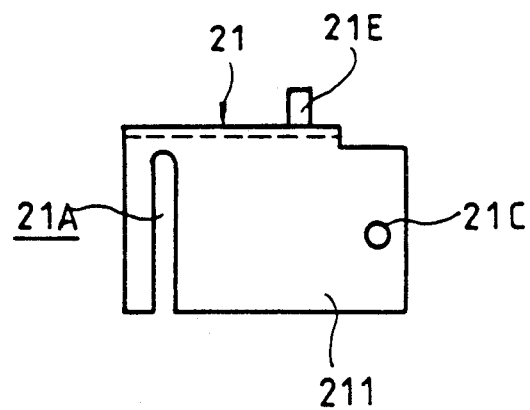
FIG. 8 is a side elevational view taken along the line 8—8 of FIG. 7.
Figure 9:
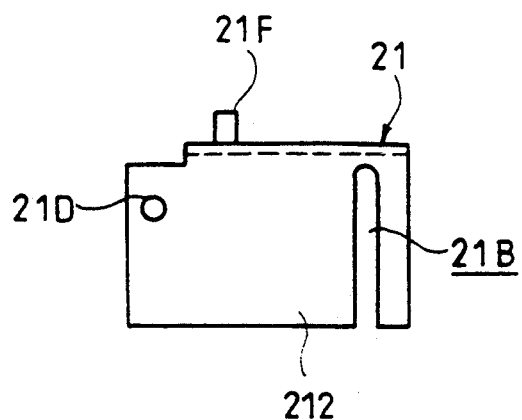
FIG. 9 is a side elevational view taken along the line 9—9 of FIG. 7.

A movable plate-like member 21, which is best illustrated in FIGS. 7-9, is fit into the deck means 200 with two perpendicular side panels 211, 212 (also referred to as first side panel and second side panel) respectively disposed next to the side plates 14, 16 of the deck means 200. Respectively formed on the first and second side panels 211, 212 are elongated side slots 21A and 21B extending substantially normal to the movable member 21 to respectively receive therein the first side rods 20A and 20C. The side panels 211, 212 are disposed between the lateral sides 201, 202 of the cassette holder 20 and the side plates 14, 16 of the deck means 200 so that the first side rods 20A, 20C extend through the side slots 21A, 21B first and then penetrate into the first L-shaped slots 14C, 16A.

Figure 14:
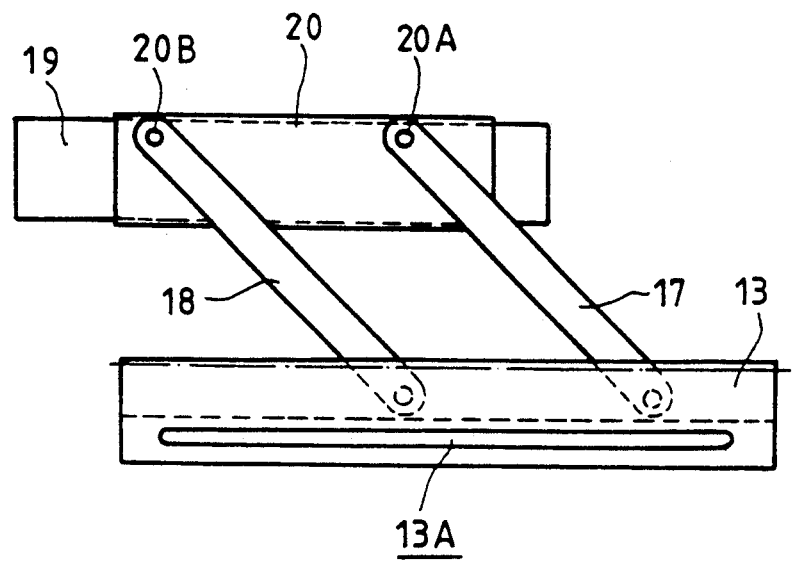
FIG. 14 is a side elevational view showing the two parallel linking bars of the cassette loading apparatus in accordance with the present invention.

Two parallel linking bars 17, 18 are pivotally connected to the rack 13 with first ends thereof and rotatably secured to the first side rod 20A and the second side rod 20B formed on the first lateral side 201 of the cassette holder 20 with second ends thereof so that the two linking bars 17, 18, the rack 13 and the cassette holder 20 together form a parallelogram linkage, as shown in FIG. 14.

On the other hand, on the second side plate 16 of the deck means 200, a linking bar 27 is at a first end thereof rotatably secured to the second side rod 20D formed on the second lateral side 202 of the cassette holder 20 and has a second end pivotally received in the slot 26B formed on the second wing 262 of the stationary member 26.

By the rotation of the gear 12, the rack 13 is moved under the guidance of the guide posts 14A, 14B. The cassette holder 20 is moved along a direction parallel with the horizontal sections of the L-shaped slots 14C, 14D of the first side plate 14 by being pulled by the parallel linking bars 17, 18. The action of the cassette holder 20 moves the movable member 21 with the engagement between the first side rod 20A and the slots 21A of the movable member 21.

The movable member 21 comprises a pair of side pins 21C, 21D respectively formed on the side panels 211, 212 thereof, extending away from each other. The side pins 21C, 21D of the movable member 21 are respectively slidably received in the elongated slots 14E, 16C of the side plates 14, 16 of the deck means 200. The movable member 21 further comprises an elongated slot 21G formed thereon substantially midway between the side panels 211, 212 and extending in a direction normal to the side pins 21C, 21D and a pair of top pins 21E, 21F formed thereon and symmetrical about the elongated slot 21G.

Figure 11:
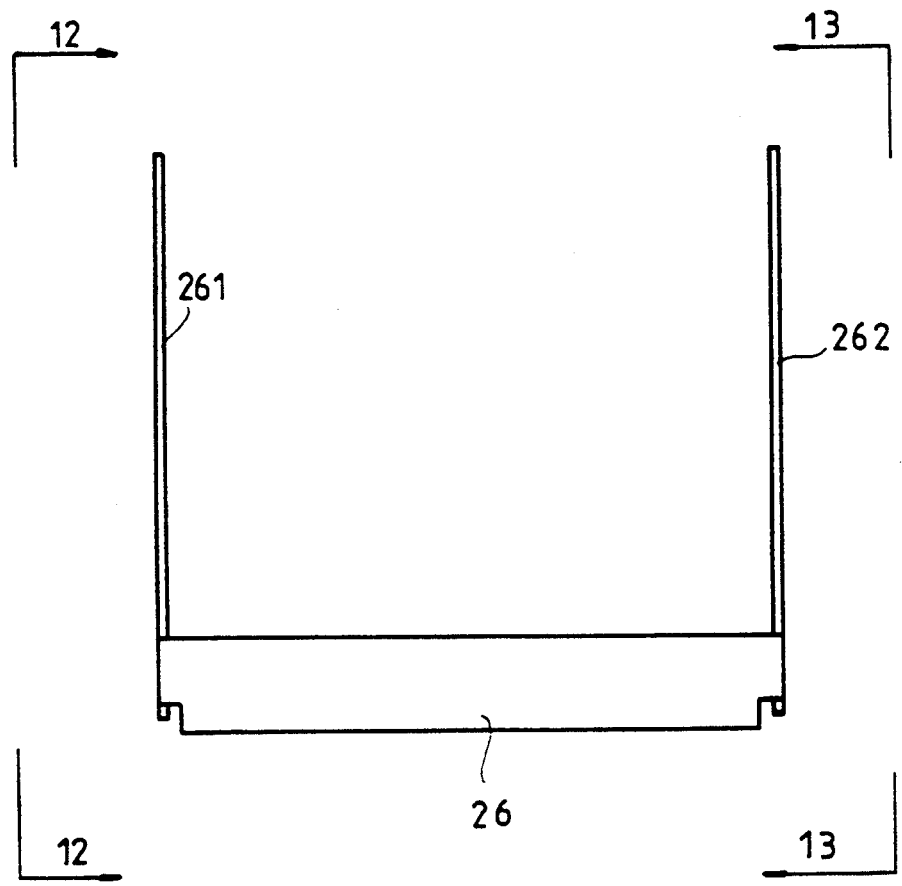
FIG. 11 is a top plan view of the stationary member of the cassette loading apparatus in accordance with the present invention.
Figure 12:
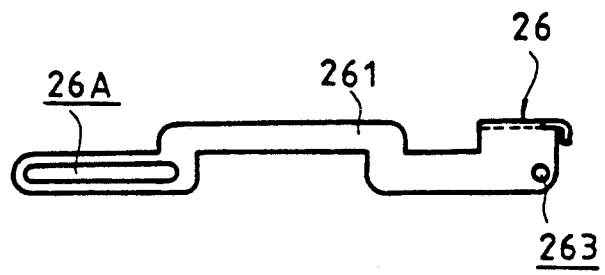
FIG. 12 is a side elevational view taken along the line 12—12 of FIG. 11.
Figure 13:
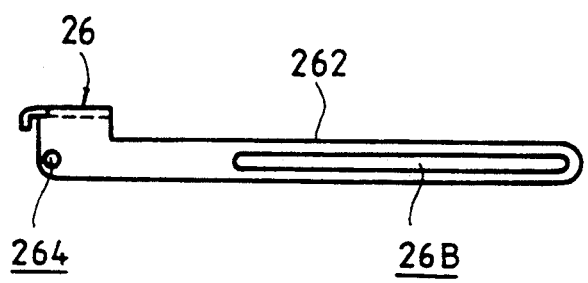
FIG. 13 is a side elevational view taken along the line 13—13 of FIG. 11.

A stationary plate-like member 26, which is best illustrated in FIGS. 11-13, is straddling over the deck means 200 with a pair of wings 261, 262 (also referred to as first wing and second wing) fit over the side plates 14, 16. The wings 261, 262 are elongated plate-like members, each having an elongated slot 26A or 26B formed thereon. Each of the wings 261, 262 is perpendicularly mounted to the stationary member 26 and extends from a connection with the stationary member 26 in a direction substantially parallel with the stationary member 26 to form a U shape when viewed from the top thereof.

The wings 261, 262 are so fit over the side plates 14, 16 of the deck means 200 that the first side rods 20A, 20C of the cassette holder 20 extend through the slots 21A, 21B of the movable member 21 and the first L-shaped slots 14C, 16A of the deck means 200 and then penetrate into the slots 26A, 26B of the wings 261, 262.

Each of the wings 261, 262 also comprises a pivot hole 263 or 264 formed thereon opposite to each other to define an axis running therethrough. The pivot holes 263, 264 are respectively fit on side pivot pins 14F, 16D formed on the side plates 14, 16 of the deck means 200 to be rotatable with respect to the deck means 200 about the axis defined by the pivot holes 263, 264.

The movable member 21 and the stationary member 26 are so disposed that they are substantially located at the same plane with the top member 15 of the deck means 20 and a first gap is present between the movable member 21 and the top member 15 and a second gap is present between the stationary member 26 and the top member 15, which gaps are large enough to avoid interferences between these members during operation. The engagement between the side pins 21C, 21D of the movable member 21 and the elongated slots 14E, 16C of the deck means 200 and that between the side rods 20A, 20C of the cassette holder 20 and the slots 26A, 26B of the stationary member 26 and the side slots 21A, 21B of the movable member 21 help maintain these members at the same plane.

Figure 10:
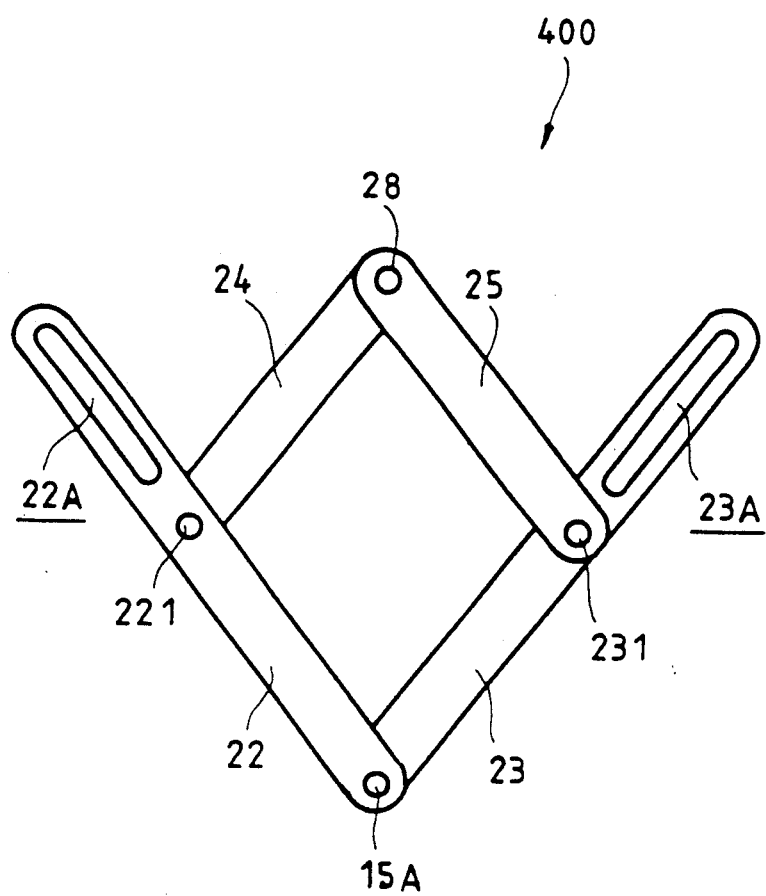
FIG. 10 is a top plan view of the four bar linkage of the cassette loading apparatus in accordance with the present invention.

A four bar linkage 400, which is best seen in FIG. 10, is connected between the top cover 15 of the deck means 200 and the movable member 21. The four bar linkage 400 comprises a pair of long links 22, 23 and a pair of short links 24, 25 forming a parallelogram structure as shown in the drawings. The long links 22, 23 are pivoted at a first pivotal point thereof with the pivot pin 15A mounted on the top member 15 of the deck means 200, which pivot pin 15A is substantially opposite to the elongated slot 21G of the movable member 21. The short links 24, 25 are pivoted at a second pivotal point with a pivot pin 28 which extends into the elongated slot 21G of the movable member 21 to be guided to move along the slot 21G only. The two short links 24, 25 are respectively pivotally connected to the long links 22, 23 at a third and a fourth pivotal points 221, 231 to form the above-mentioned parallelogram structure so that when the pivot pin 28 moves along the elongated slot 21G of the movable member 21, the long links 22, 23 are rotated relative to each other.

Each of the long links 22, 23 comprises an extension with an elongated slot 22A or 23A formed thereon to respectively slidably receive therein the top pin 21E, 21F of the movable member 21. The slots 22A, 23A are so formed that when the movable member 21 is moved under the guidance of the slots 14C, 14D, 14E of the first side plate 14 toward the stationary member 26, the constraints imposed on the slots 22A, 23A by the top pins 21E, 21F force the long links 22, 23 to rotate away from each other and thus moving the pivot pin 28 under the guidance of the slot 21G of the movable member 21 toward the stationary member 26 by the pivotal engagements 221, 231 between the long links 22, 23 and the short links 24, 25. On the other hand, when the movable member 21 is moved away from the stationary member 26, all members or elements move or rotate in an opposite direction.

The presence of the four bar linkage 400 is to ensure that the force or motion applied to one of the lateral sides 201, 202 of the cassette holder 20 can be stably transmitted to the other side and thus making the cassette holder 20 move in a symmetrical, stable way without vibration or jam. When a force acts upon the first lateral side 201 of the cassette holder 20 to move this lateral side 201, the motion is transmitted to the second top pin 21F via the first top pin 21E and the four bar linkage 400 and thus moving the second lateral side 202 of the cassette holder 20 in a symmetrical way.

Figure 15:
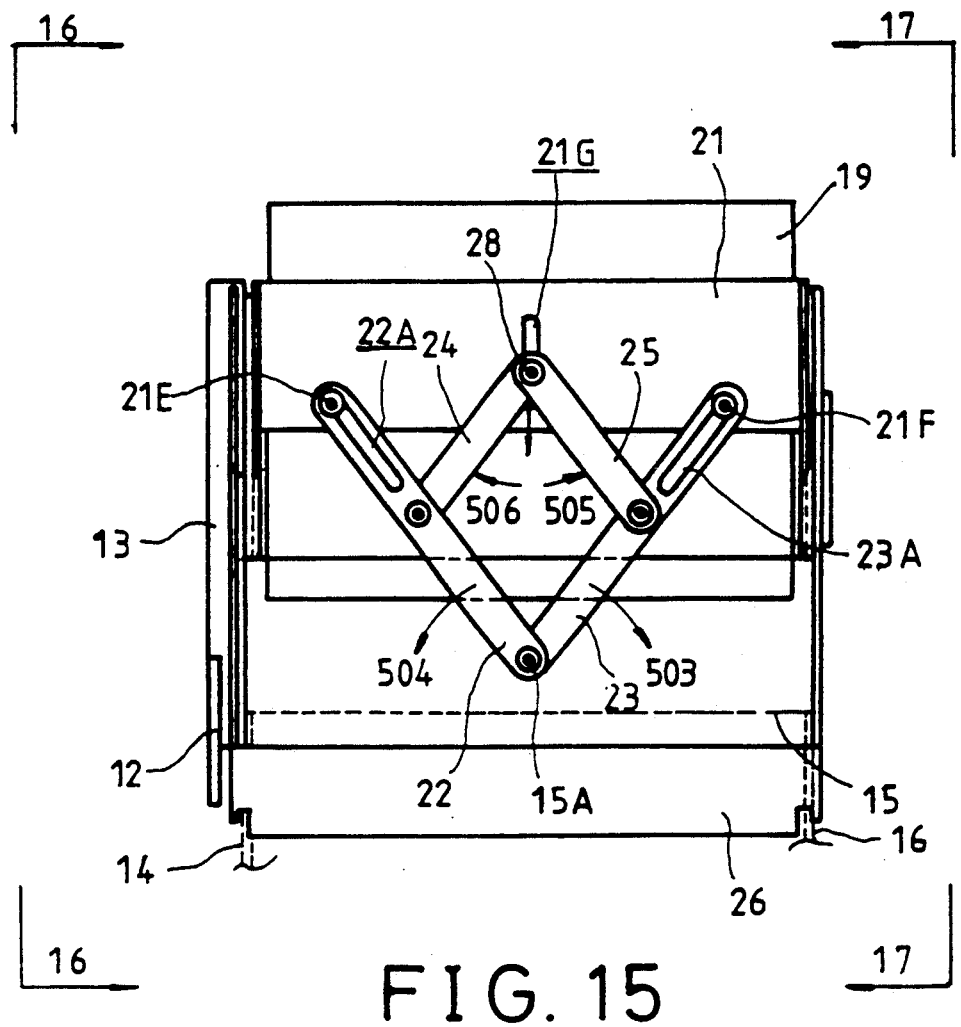
FIG. 15 is a top plan view showing the cassette loading apparatus of the present invention in the unloading position.
Figure 16:
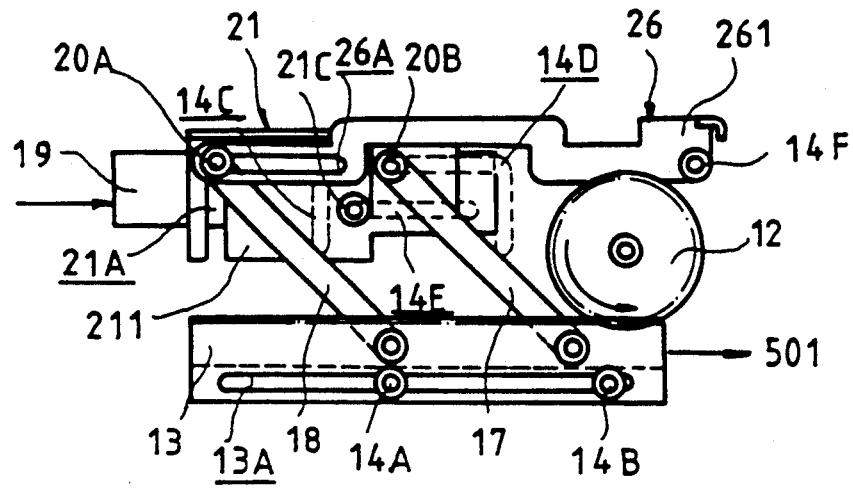
FIG. 16 is a side elevational view taken along the line 16—16 of FIG. 15.
Figure 17:
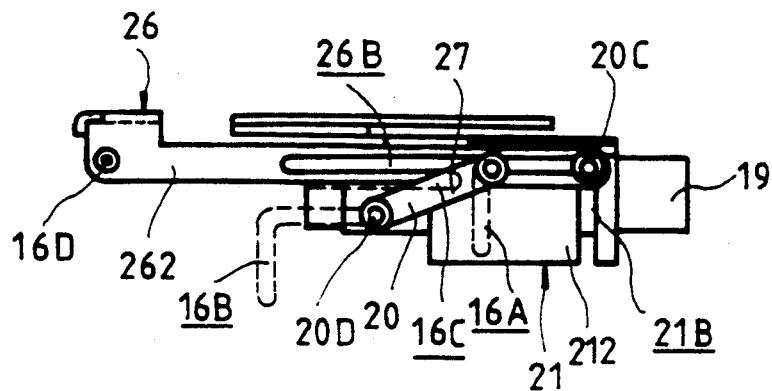
FIG. 17 is a side elevational view taken along the line 17—17 of FIG. 15.

A counterclockwise rotation of the gear 12 (as viewed in FIGS. 2, 5 and 16) moves the rack 13 from the movable member 21 toward the stationary member 26, as indicated by the arrow 501 of FIG. 16. As mentioned previously, the movement of the rack 13 pulls the cassette holder 20 to move along the slots 14C, 14D, 14E of the first side plate 14. For the purpose of being easy to clearly explain the function of the present cassette loading apparatus 300, assuming, without loss of the generality, the current situation of the cassette loading apparatus 300 is that shown in FIGS. 15-17, which is herein referred to as the unloading position. With the movement of the rack 13 in the direction indicated by the arrow 501, the cassette holder 20 is also moved in the same direction by the pulling of the parallel linking bars 17, 18. The motion of the cassette holder 20 drives the movable member 21 toward the stationary member 26 due to the engagement of the first side rod 20A with the side slot 21A formed on the first side panel 211 of the movable member 21, the side pins 21C formed on the first side panel 211 of the movable member 21 being sliding in the elongated slot 14E formed on the first side plate 14 of the deck means 200. And under this situation, the long links 22, 23 are rotated about the pivot 15A away from each other as indicated by arrows 503, 504 of FIG. 15 and thus rotating the short links 24, 25 along the arrows 505, 506 and moving the pivot pin 28 along the direction 507.

As previously explained, the motion is symmetrically transmitted to the second lateral side 202 of the cassette holder 20 via the four bar linkage 400. Therefore, the second side panel 212 of the movable member 21 is moved in symmetry to the first side panel 211. The second side panel 212 of the movable member 21 then moves the first side rod 20C formed on the second lateral side 202 of the cassette holder 20 which in turn moves the second lateral side 202 of the cassette holder 20 along the L-shaped slots 16A, 16B formed on the second side plate 15 of the deck means 200. This provides the second lateral side 202 of the cassette holder 20 with a symmetrical motion with respect to the first lateral side 201 of the cassette holder 20 and thus avoiding any instability or jamming so induced in moving the cassette holder 20 with respect the deck means 200.

Figure 18:
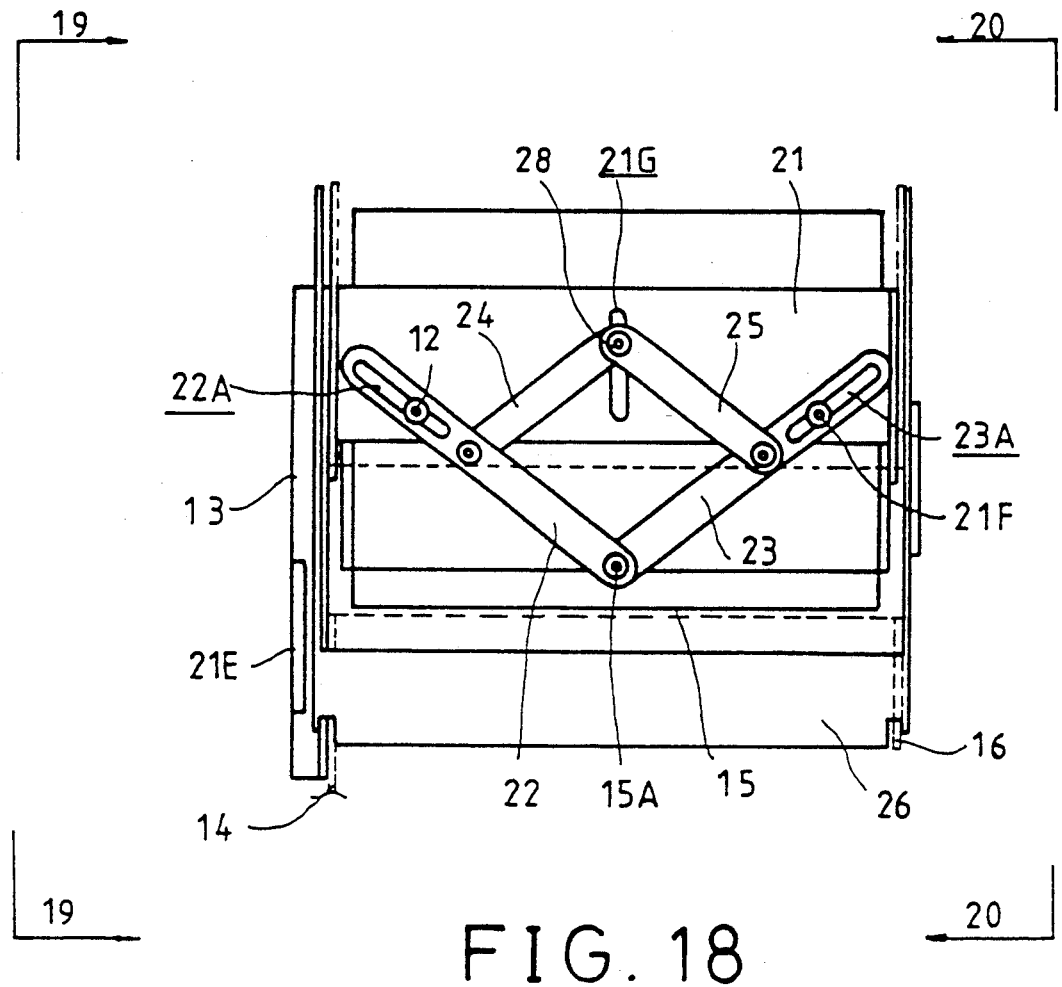
FIG. 18 is a top plan view showing the cassette loading apparatus of the present invention in the intermediate position.
Figure 19:
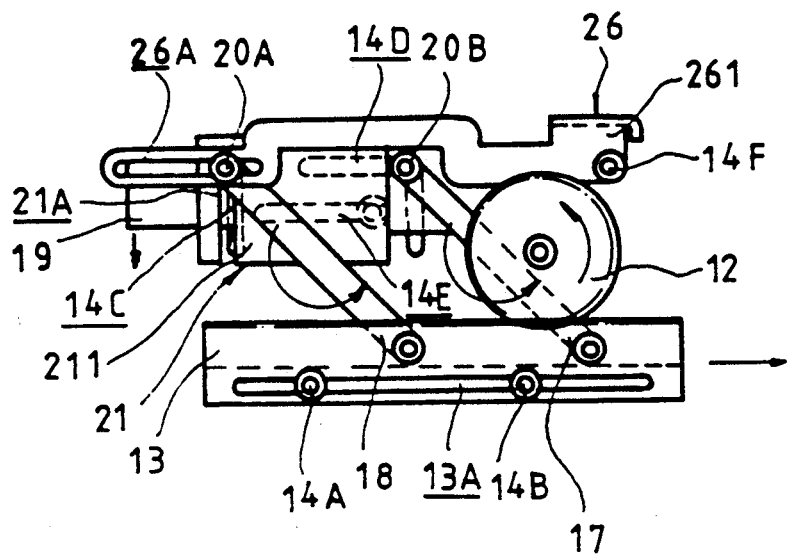
FIG. 19 is a side elevational view taken along the line 19—19 of FIG. 18.
Figure 20:
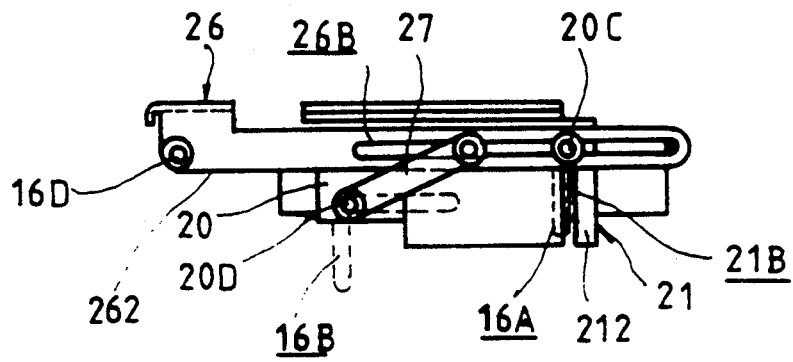
FIG. 20 is a side elevational view taken along the line 20—20 of FIG. 18.

The movement of the cassette holder 20 continues along the horizontal sections of the L-shaped slots 14C, 14D, 16A, 16B to the connections between the horizontal sections and the vertical sections thereof. This situation is shown in FIGS. 18-20 and is herein referred to as the intermediate position.

Once the cassette holder 20 reaches the connection corners of the L-shaped slots 14C, 14D, 16A, 16B, a further rotation of the gear 12 moves the cassette holder 20 downward along the vertical sections of the L-shaped slots 14C, 14D, 16A, 16B. The downward movement of the cassette holder 20 pulls the first wing 261 of the stationary member 26 to rotate downward about the pivots 14F, 16D of the deck means 200 by being pulled by the linking bar 18.

Preferably, the gear 12 is provided with a high friction coefficient material formed thereon and the linking bar 17 is disposed in such a way that when the rack 13 is moved to such a location that the cassette holder 20 is about to move downward, the linking bar 17 contacts the high friction coefficient material formed on the gear 12 which further forces the linking bar 17 to facilitate the downward movement of the cassette holder 20.

Figure 21:
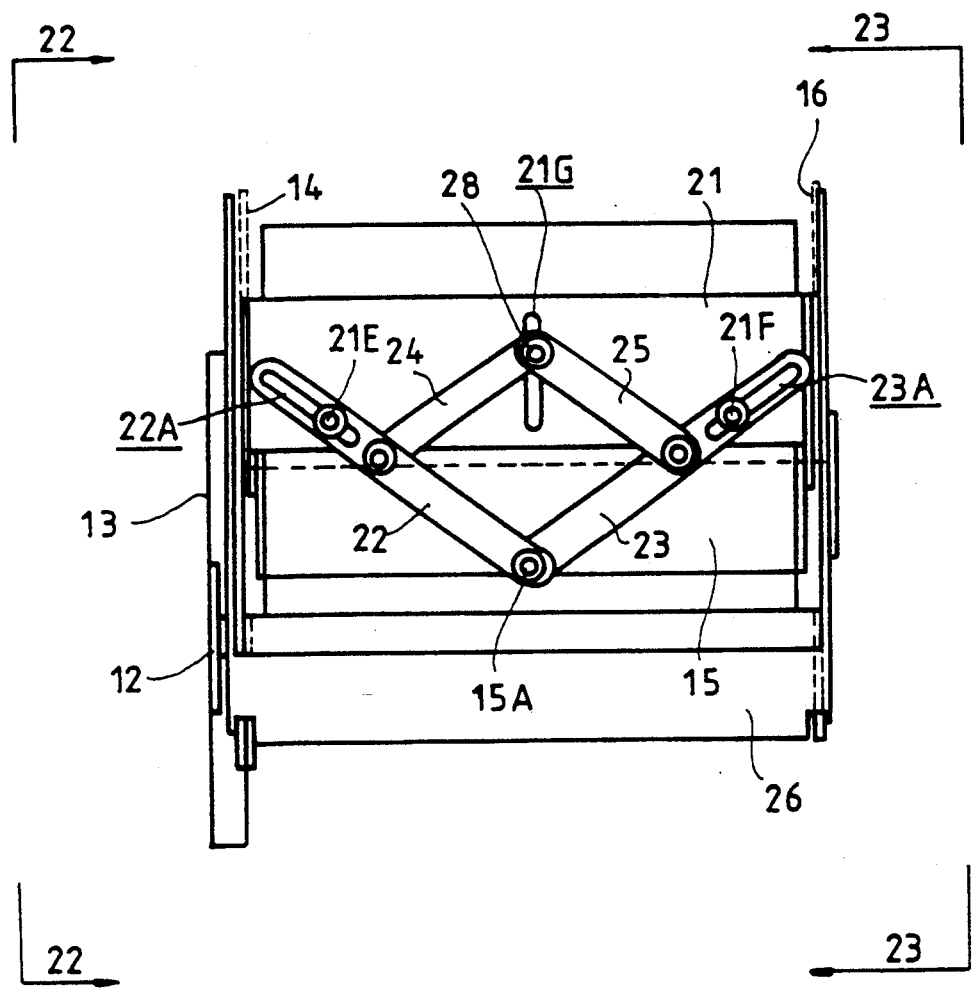
FIG. 21 is a top plan view showing the cassette loading apparatus of the present invention in the loading position.
Figure 22:
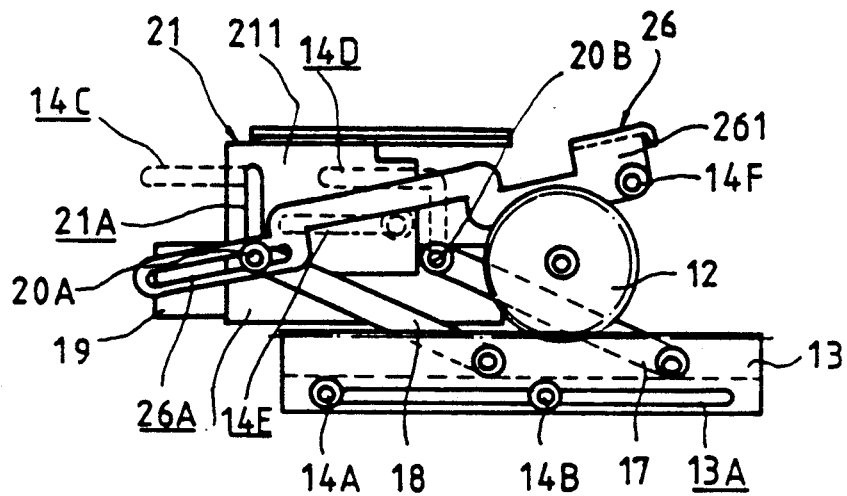
FIG. 22 is a side elevational view taken along the line 22—22 of FIG. 21.
Figure 23:
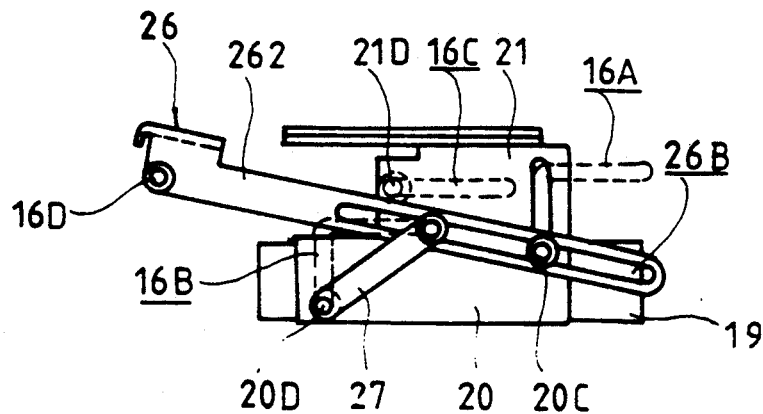
FIG. 23 is a side elevational view taken along the line 23—23 of FIG. 21.

With the arrangement of the pivots 14F, 16D of the deck means 200, the downward movement of the cassette holder 20 causes the stationary member 26 to rotate about the pivots 14F, 16D due to the connection between the first wing 261 and the rack 13 by the linking bar 18 and that between the second wing 262 and the second side rod 20D formed on the second lateral side 202 of the cassette holder 20 by the linking bar 27. The linking bars 18, 27 pull the wings 261, 262 to rotate downward about the pivots 14F, 16D and eventually, the cassette holder 20 is moved downward to reach the position shown in FIGS. 21-23 which is herein referred to as the loading position.

To unload the cassette 19 from the magnetic recording cassette playing apparatus 100, the gear 12 is rotated in a reversed direction by the motor 4 and thus causing the cassette loading apparatus 300 to function in a reversed direction to move the cassette holder 20 from the loading position (shown in FIGS. 21-23) to the intermediate position (shown in FIGS. 18-20) and finally arriving at the unloading position (shown in FIGS. 15-17) to allow the cassette 19 to be manually removed out of the cassette holder 25.

It is apparent that although the invention has been described in connection with a preferred embodiment, those skilled in the art may make changes to certain features of the preferred embodiment without departing from the spirit and scope of the invention as defined in the appended claims.

What is claimed is:

1. A cassette loading apparatus for loading a magnetic recording cassette which is removably disposed within a cassette holder into a rotary drum deck of a cassette playing apparatus which deck comprises a bottom member having mounted thereon a cassette driving means for driving reel hubs of the cassette on which a magnetic recording medium is wounded and signal sensing means which reads a magnetic signal from the magnetic recording medium traveling therethrough, a first side plate and a second side plate substantially perpendicularly mounted on said bottom member to define therebetween a space for receiving therein the cassette holder, and a top member connected between the first side plate and the second side plate, each of said side plates defining thereon a pair of first slots and a second slot, a mechanical transmission system being provided to transmit torque from a torque source to said cassette loading apparatus, said mechanical transmission system comprising at least a gear rotatably mounted on said first side plate with a rack which is slidable along the first side plate mating therewith, said cassette loading apparatus comprising:

a movable member which is a plate-like member fit within said deck with a first side panel and a second side panel thereof respectively parallel with and adjacent to said first side plate and said second side plate in such a way so as to be movable relative thereto, said side panels being substantially normal to said movable member, each of said side panels comprising an elongated side slot formed thereon, extending in a direction normal to said movable member, each of said side panels further comprising a side pin formed thereon, extending away from each other, said movable member further comprising an elongated slot extending normal to said side pins of the side panels thereof and located substantially midway between the side panels, a pair of top pins being formed on said movable member in symmetry with respect to said elongated slot, a first gap being formed between said movable member and said top member, said first gap being sufficiently large to avoid interference with the operation of said movable member;

a stationary member which is a plate-like member straddling over said deck with a first wing and a second wing thereof respectively fit over said first side plate and said second side plate in such a way so as to be movable relative thereto, said wings being substantially perpendicular to said stationary member and extending in a direction parallel with said stationary member to form into a substantially U shape and each of said wings having a slot formed thereon, each of said wings further comprising a pivot hole formed thereon opposite to each other to respectively receive therein a pivot pin formed on the first side plate and a pivot pin formed on the second side plate so as to define a pivotal axis about which said stationary member is rotatable relative to said deck, a second gap being formed between said stationary member and said top member, said second gap being sufficiently large to avoid interference with the operation of said stationary member; said cassette holder comprising a first lateral side and a second lateral side on each of which a first side rod and a second side rod are formed, said first side rods respectively extending through the side slots formed on the side panels of said movable member and then penetrating through one of the first slots of the side plates of said deck and eventually received in the slots formed on the wings of said stationary member, the second side rods respectively extending into the other one of the first slots of said side plates, the side pins of said movable member being received in the second slots of the side plates of said deck;

a four bar linkage, which is disposed between said movable member and said top member, comprising two long links pivotally connected at a first pivot point with a top pivot pin formed on the top member and two short links pivotally connected at a second pivot point with a pivot which extends into the elongated slot formed on said movable member to be guided thereby, the two short links being pivotally connected to the two long links at a third and a fourth pivot points to form a parallelogram structure, each of the long links comprising a slot to receive therein and guide one of the top pins of said movable member so that when said cassette holder is moved at the first lateral side thereof, the movement is substantially transmitted to the second lateral side thereof by said four bar linkage; and a pair of first linking bars which are parallel with each other and each of which has a first end rotatably secured to said rack and a second end respectively rotatably secured on the first side rod and the second side rod formed on the first lateral side of said cassette holder so that when said rack is moved by the rotation of the gear in a first direction, said cassette holder is pulled to move in the first direction by the parallel linking bars, and a second linking bar connected between the second side rod of said second lateral side of said cassette holder and the slot formed on the second wing of said stationary member, said second linking bar having a first end pivotally secured to the second side rod of said second lateral side of said cassette holder and a second end rotatably and movably received in the slot formed on said second wing.

2. A cassette loading apparatus as claimed in claim 1, wherein said first slots formed on the side plates of said deck are L-shaped slots, each having a horizontal section and a vertical section with a connection corner formed therebetween so that when said rack moves to drive the first and the second side rods formed on the first lateral side of said cassette holder to move along the horizontal sections of the L-shaped slots of the first side plate toward the connection corners and then changing direction to slide down the vertical sections of the L-shaped slots, the first linking bars pull the first and the second side rods formed on the first lateral side of said cassette holder to move downward along the vertical sections of the L-shaped slots.

3. A cassette loading apparatus as claimed in claim 2, wherein a high friction coefficient material is provided on said gear and wherein said parallel linking bars are so disposed that when said rack is moved to such a location that said cassette holder is about to move downward, one of said linking bars contacts the high friction coefficient material and is frictionally driven thereby to facilitate the downward movement.

4. A cassette loading apparatus as claimed in claim 1, wherein said second slots of said deck are elongated slots extending in a substantially horizontal direction.

* * * * *